(12) United States Patent
May

(10) Patent No.: US 11,147,287 B2
(45) Date of Patent: Oct. 19, 2021

(54) COMPARTMENTALIZED WATER SOLUBLE BEVERAGE POD

(71) Applicant: Brandon May, Saratoga Springs, NY (US)

(72) Inventor: Brandon May, Saratoga Springs, NY (US)

(*) Notice: Subject to any disclaimer, the term of this patent is extended or adjusted under 35 U.S.C. 154(b) by 133 days.

(21) Appl. No.: 16/385,654

(22) Filed: Apr. 16, 2019

(65) Prior Publication Data
US 2020/0329727 A1    Oct. 22, 2020

(51) Int. Cl.
| | | |
|---|---|---|
| *A23F 5/40* | (2006.01) | |
| *A23F 5/38* | (2006.01) | |
| *A23L 2/395* | (2006.01) | |
| *A23L 2/66* | (2006.01) | |

(52) U.S. Cl.
CPC .............. *A23F 5/405* (2013.01); *A23F 5/385* (2013.01); *A23L 2/395* (2013.01); *A23L 2/66* (2013.01); *A23V 2002/00* (2013.01)

(58) Field of Classification Search
CPC ..... A23V 2002/00; A23F 5/405; A23F 5/385; A23L 2/395; A23L 2/66
USPC ........ 426/590, 394, 398, 411, 413, 414, 416
See application file for complete search history.

(56) References Cited

U.S. PATENT DOCUMENTS

| | | |
|---|---|---|
| 5,433,962 A | 7/1995 | Stipp |
| 6,291,006 B1 | 9/2001 | Butterbaugh |
| 2007/0184172 A1 | 8/2007 | Timmerman |
| 2009/0162489 A1 | 6/2009 | Singh |
| 2010/0055254 A1 | 3/2010 | Hu |
| 2017/0283749 A1 | 10/2017 | Brandt |
| 2018/0057228 A1 | 3/2018 | Singer |
| 2018/0057230 A1 | 3/2018 | Johnson |

FOREIGN PATENT DOCUMENTS

WO    WO2007137218    11/2007

*Primary Examiner* — Helen F Heggestad

(57) ABSTRACT

A compartmentalized water soluble beverage pod for facile beverage preparation includes a plurality of secondary shells that is coupled to a primary shell. The primary shell defines an interior space and each secondary shell defines an associated internal space. The primary shell and the plurality of secondary shells are water soluble. An associated substance, which comprises at least one of a beverage concentrate, a sweetening agent, a creamer concentrate, and a flavoring agent, is positioned in each of the interior space and the internal spaces. The primary shell and the plurality of secondary shells are configured to dissolve when positioned in water so that the associated substances are released to dissolve in the water to form a beverage.

3 Claims, 4 Drawing Sheets

COMPARTMENTALIZED WATER SOLUBLE BEVERAGE POD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to beverage pods and more particularly pertains to a new beverage pod for facile beverage preparation.

BRIEF SUMMARY OF THE INVENTION

An embodiment of the disclosure meets the needs presented above by generally comprising a plurality of secondary shells that is coupled to a primary shell. The primary shell defines an interior space and each secondary shell defines an associated internal space. The primary shell and the plurality of secondary shells are water soluble. An associated substance, which comprises at least one of a beverage concentrate, a sweetening agent, a creamer concentrate, and a flavoring agent, is positioned in each of the interior space and the internal spaces. The primary shell and the plurality of secondary shells are configured to dissolve when positioned in water so that the associated substances are released to dissolve in the water to form a beverage.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
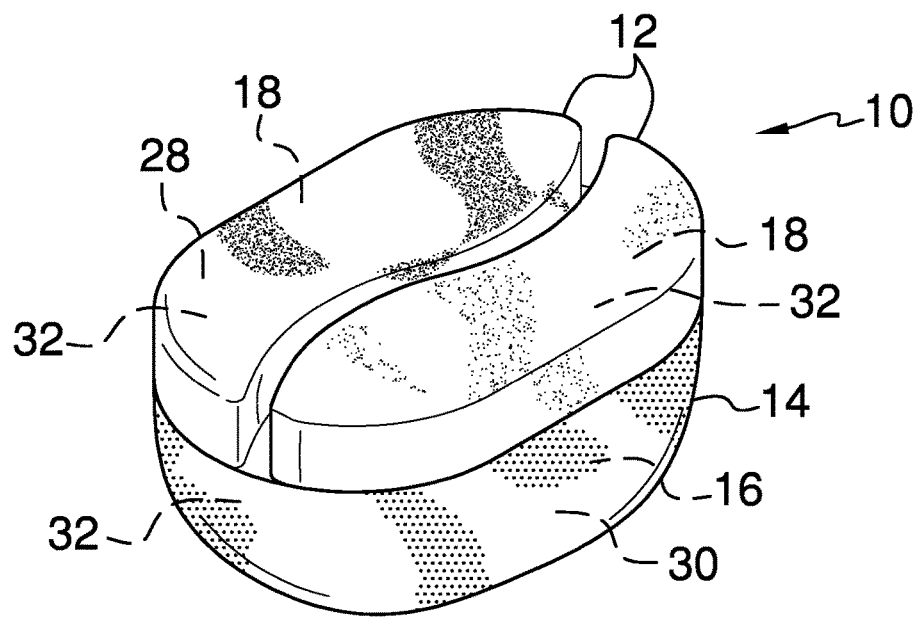
FIG. 1 is an isometric perspective view of a compartmentalized water soluble beverage pod according to an embodiment of the disclosure.

With reference now to the drawings, and in particular to FIGS. 1 through 7 thereof, a new beverage pod embodying the principles and concepts of an embodiment of the disclosure and generally designated by the reference numeral 10 will be described.

As best illustrated in FIGS. 1 through 7, the compartmentalized water soluble beverage pod 10 generally comprises a plurality of secondary shells 12 that is coupled to a primary shell 14. The plurality of secondary shells 12 comprises from one to four secondary shells 12. The primary shell 14 defines an interior space 16 and each secondary shell 12 defines an associated internal space 18. The primary shell 14 and the plurality of secondary shells 12 are water soluble.

The primary shell 14 and the plurality of secondary shells 12 comprise at least one of a protein, a polysaccharide, a polyalcohol, a hydrocolloid, and a lipid. The primary shell 14 and the plurality of secondary shells 12 comprise at least one of polyvinyl alcohol, casein, whey, starch, pectin, cellulose, hemicellulose, collagen, gelatin, chitosan, alginate, and carrageenan. The primary shell 14 and the plurality of secondary shells 12 comprise polyvinyl alcohol.

Figure 2:
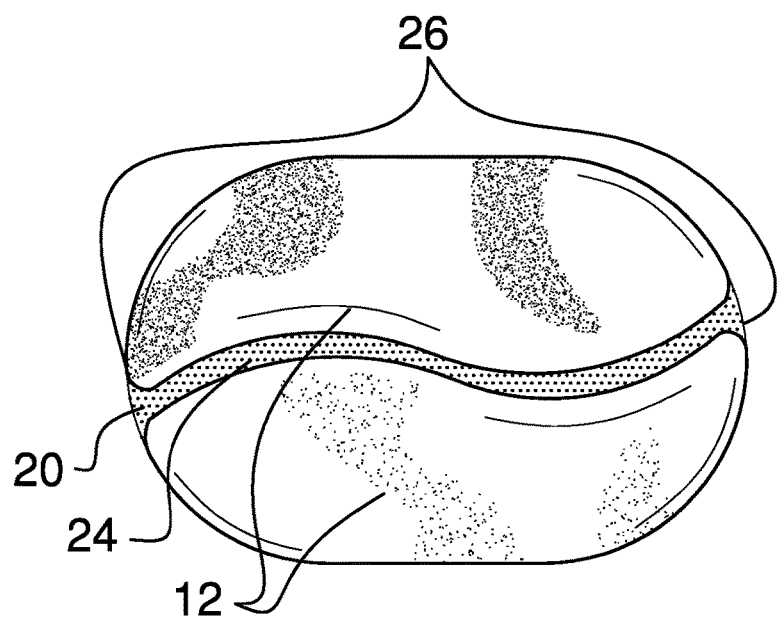
FIG. 2 is a top view of an embodiment of the disclosure.
Figure 3:
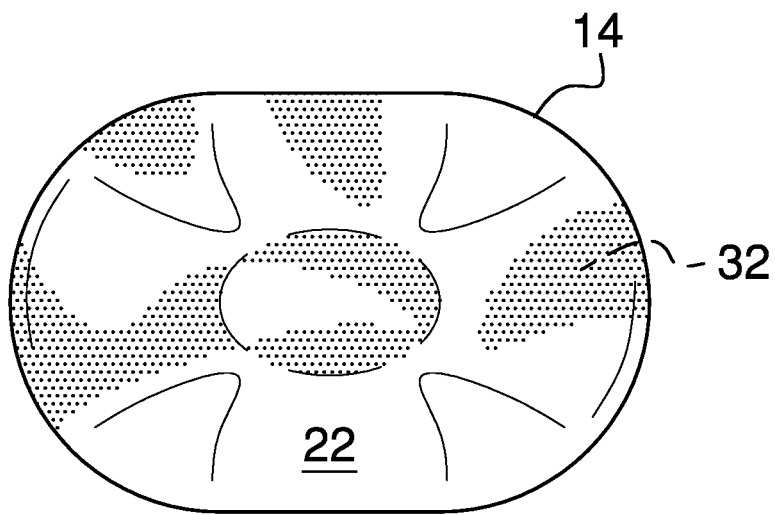
FIG. 3 is a bottom view of an embodiment of the disclosure.
Figure 4:
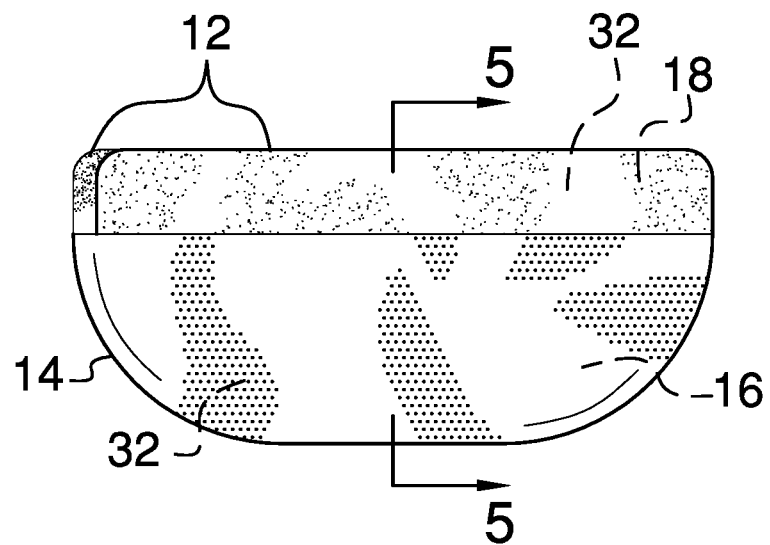
FIG. 4 is a side view of an embodiment of the disclosure.
Figure 5:
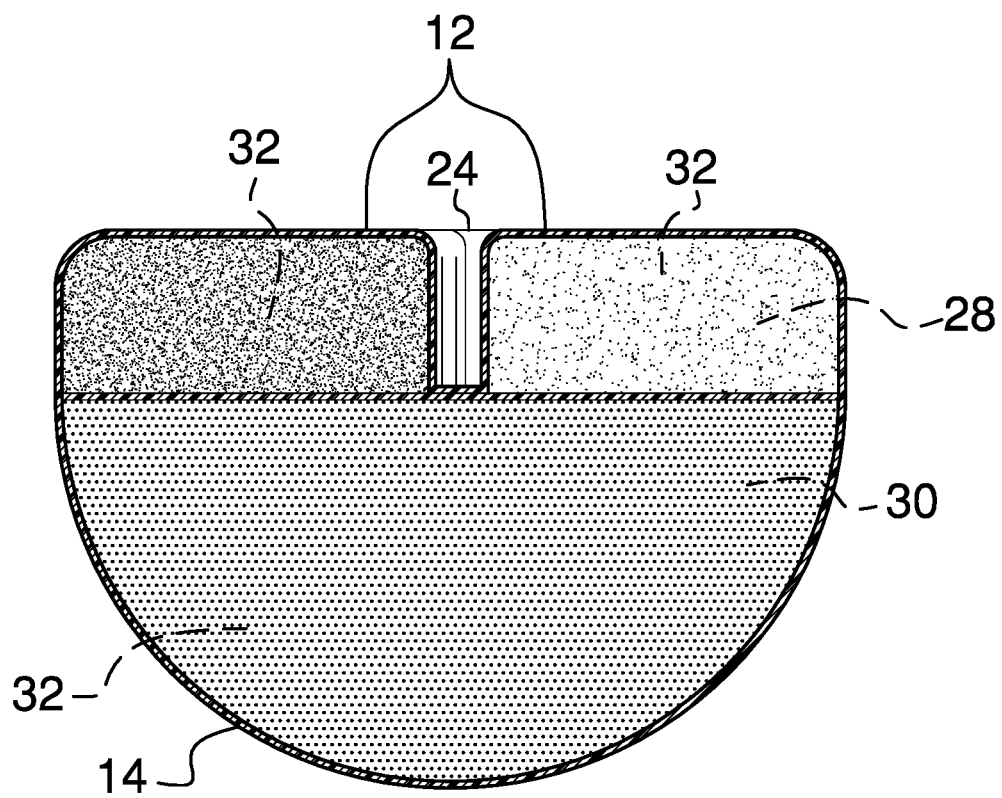
FIG. 5 is a cross-sectional view of an embodiment of the disclosure.

The primary shell 14 is half ovoid shaped so that the primary shell 14 has a planar face 20 and an arcuate face 22. The plurality of secondary shells 12 comprises two secondary shells 12, each of which is coupled to the planar face 20. The secondary shells 12 are positioned on the planar face 20 and are shaped so that the secondary shells 12 define a channel 24 that extends between opposing ends 26 of the planar face 20. The channel 24 is elongated S-shaped, as shown in FIG. 2, so that the primary shell 14 and the secondary shells 12 together resemble a coffee bean.

Each secondary shell 12 has a volume 28 that is from 10 to 90 percent of a capacity 30 of the primary shell 14. Each secondary shell 12 has a volume 28 that is from 25 to 75 percent of the capacity 30 of the primary shell 14. Each secondary shell 12 has a volume 28 that is approximately 50 percent of the capacity 30 of the primary shell 14.

An associated substance 32, which comprises at least one of a beverage concentrate, a sweetening agent, a creamer concentrate, and a flavoring agent, is positioned in each of the interior space 16 and the internal spaces 18. The primary shell 14 and the plurality of secondary shells 12 are configured to dissolve when positioned in water so that the associated substances 32 are released to dissolve in the water to form a beverage. The volume 28 of each secondary shell 12 and the capacity 30 of the primary shell 14 provide quantities of the associated substances 32 that correspond to a single serving of the beverage. Each associated substance 32 has a physical state that comprises at least one of liquid, syrup, granulate, ground, and powder.

The potential combinations of associated substances 32 and their positioning in the primary shell 14 and the plurality of secondary shells 12 is essentially limitless. By way of nonlimiting example, a beverage pod 10 having two secondary shells 12 coupled to the primary shell 14 may have a coffee concentrate positioned in the interior space 16 of the primary shell 14, a creamer concentrate positioned in the internal space 18 of one of the secondary shells 12, and a sweetening agent positioned in the internal space 18 of the other of the secondary shells 12.

Figure 6:
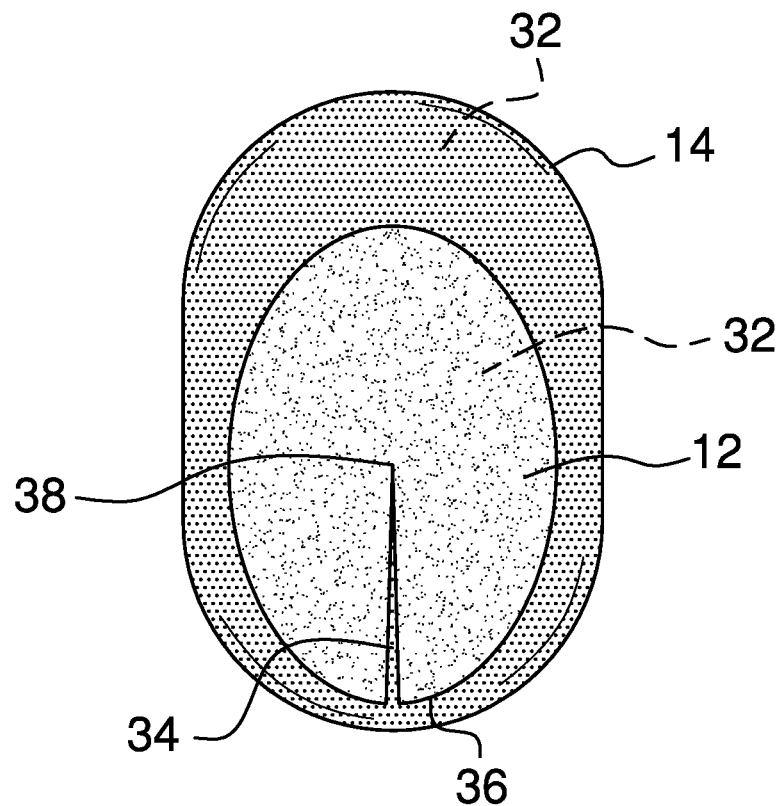
FIG. 6 is a top view of an alternative embodiment of the disclosure.
Figure 7:
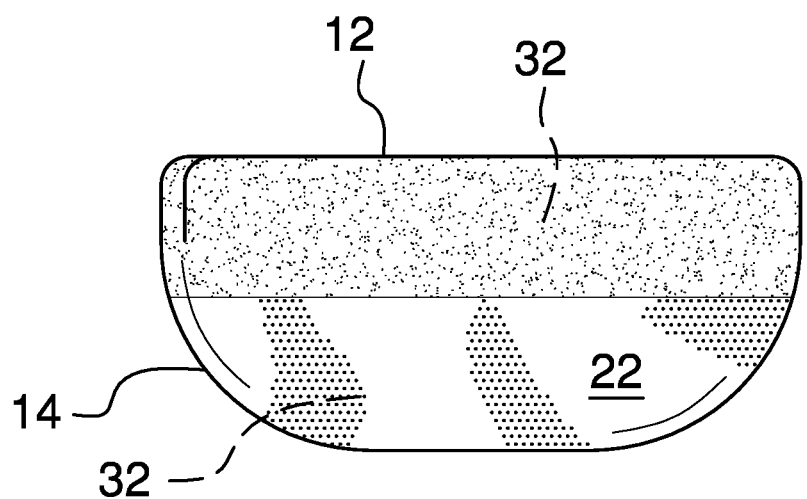
FIG. 7 is a side view of an alternative embodiment of the disclosure.

In alternative embodiments of the invention, as shown in FIGS. 6 and 7, the plurality of secondary shells 12 comprises one secondary shell 12 that is coupled to the planar face 20 of the primary shell 14. The secondary shell 12 is disc shaped. The secondary shell 12 has a volume 28 from 10 to 100 percent of the capacity 30 of the primary shell 14. The secondary shell 12 has a volume 28 from 50 to 100 percent of the capacity 30 of the primary shell 14. The secondary shell 12 has a volume 28 of approximately 100 percent of the capacity 30 of the primary shell 14, as shown in FIG. 7. The secondary shell 12 has a volume 28 of approximately 50 percent of the capacity 30 of the primary shell 14, as shown in FIG. 6.

A cutout 34 is positioned in the secondary shell 12, as shown in FIG. 6. The cutout 34 extends from an edge 36 of the secondary shell 12 to proximate to a midpoint 38 of the secondary shell 12. The cutout 34 is narrow wedge shaped so that the secondary shell 12 resembles a coffee bean.

In use, the beverage pod 10 is added to hot or cold water, where it dissolves and releases the associated substances 32. The mixture is stirred to create a homogenous beverage that is ready to drink.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A compartmentalized water soluble beverage pod comprising:
    a secondary shell coupled to a primary shell, the primary shell defining an interior space, the secondary shell defining an associated internal space, the primary shell and the secondary shell being water soluble, the primary shell being half ovoid shaped such that the primary shell has a planar face and an arcuate face, the secondary shell being coupled to the planar face, the secondary shell being positioned on the planar face;
    an associated substance positioned in each of the interior space and the internal spaces, the associated substance comprising at least one of a beverage concentrate, a sweetening agent, a creamer concentrate, and a flavoring agent wherein the primary shell and the plurality of secondary shells are configured for dissolving when positioned in water such that the associated substances are released to dissolve in the water to form a beverage
    a cutout positioned in the secondary shell, the cutout extending from an edge of the secondary shell to proximate to a midpoint of the secondary shell, the cutout being narrow wedge shaped such that the secondary shell resembles a coffee bean.

2. A compartmentalized water soluble beverage pod comprising:
    a plurality of secondary shells coupled to a primary shell, the primary shell defining an interior space, each secondary shell defining an associated internal space, the primary shell and the plurality of secondary shells being water soluble, the primary shell and the plurality of secondary shells comprising at least one of a protein, a polysaccharide, a polyalcohol, a hydrocolloid, and a lipid, the primary shell and the plurality of secondary shells comprising at least one of polyvinyl alcohol, casein, whey, starch, pectin, cellulose, hemicellulose, collagen, gelatin, chitosan, alginate, and carrageenan, the primary shell and the plurality of secondary shells comprising polyvinyl alcohol, the plurality of secondary shells comprising from one to four secondary shells, the primary shell being half ovoid shaped such that the primary shell has a planar face and an arcuate face, the plurality of secondary shells comprising two secondary shells, each secondary shell being coupled to the planar face, the secondary shells being positioned on the planar face and shaped such that the secondary shells define a channel extending between opposing ends of the planar face, the channel being elongated S-shaped such that the primary shell and the secondary shells together resemble a coffee bean, each secondary shell having a volume from 10 to 90 percent of a capacity of the primary shell, each secondary shell having a volume from 25 to 75 percent of the capacity of the primary shell, each secondary shell having a volume of approximately 50 percent of the capacity of the primary shell; and
    an associated substance positioned in each of the interior space and the internal spaces, the associated substance comprising at least one of a beverage concentrate, a sweetening agent, a creamer concentrate, and a flavoring agent wherein the primary shell and the plurality of secondary shells are configured for dissolving when positioned in water such that the associated substances are released to dissolve in the water to form a beverage, the volume of each secondary shell and the capacity of the primary shell providing quantities of the associated substances corresponding to a single serving of the beverage, each associated substance having a physical state comprising at least one of liquid, syrup, granulate, ground, and powder.

3. The beverage pod of claim 2, further comprising:

the plurality of secondary shells comprising one secondary shell coupled to the planar face, the secondary shell being disc shaped, the secondary shell having a volume from 10 to 100 percent of the capacity of the primary shell, the secondary shell having a volume from 50 to 100 percent of the capacity of the primary shell, the secondary shell having a volume of approximately 100 percent of the capacity of the primary shell, the secondary shell having a volume of approximately 50 percent of the capacity of the primary shell; and a cutout positioned in the secondary shell, the cutout extending from an edge of the secondary shell to proximate to a midpoint of the secondary shell, the cutout being narrow wedge shaped such that the secondary shell resembles a coffee bean.

\* \* \* \* \*